US012623396B2

(12) United States Patent
Schneider et al.

(10) Patent No.: US 12,623,396 B2
(45) Date of Patent: May 12, 2026

(54) HAND TOOL FOR SEPARATING A DEEP-DRAWN JAW-SPANNING DENTAL APPARATUS OF THERMOFORM FILM

(71) Applicant: DENTSPLY SIRONA Inc., York, PA (US)

(72) Inventors: Hans-Christian Schneider, Einhausen (DE); Peter Burger, Bensheim (DE)

(73) Assignee: Dentsply Sirona Inc., York, PA (US)

( * ) Notice: Subject to any disclaimer, the term of this patent is extended or adjusted under 35 U.S.C. 154(b) by 685 days.

(21) Appl. No.: 17/915,138

(22) PCT Filed: Mar. 11, 2021

(86) PCT No.: PCT/EP2021/056135
§ 371 (c)(1),
(2) Date: Sep. 28, 2022

(87) PCT Pub. No.: WO2021/197786
PCT Pub. Date: Oct. 7, 2021

(65) Prior Publication Data
US 2023/0150185 A1    May 18, 2023

(30) Foreign Application Priority Data

Mar. 20, 2020    (EP) ..................................... 20166847

(51) Int. Cl.
*B29C 51/44*    (2006.01)
*A61C 7/08*    (2006.01)
(52) U.S. Cl.
CPC ................ *B29C 51/44* (2013.01); *A61C 7/08* (2013.01); *B29C 51/445* (2013.01)

(58) Field of Classification Search
CPC ........ B29C 51/44; B29C 51/445; B29C 51/46
See application file for complete search history.

(56) References Cited

U.S. PATENT DOCUMENTS 2,041,018 A * 5/1936 Persons ................. B23K 3/029
                                                                        219/541
3,699,306 A * 10/1972 Finch ................... B23K 3/0338
                                                                        228/55

(Continued)

FOREIGN PATENT DOCUMENTS

CN        1239452 A    12/1999
CN        1727994 A    2/2006

(Continued)

OTHER PUBLICATIONS

Machine Translation of Fujima, Mar. 5, 2012 (Generated Jul. 18, 2025), Espacenet (Year: 2012).*

(Continued)

*Primary Examiner* — Andrew L Swanson
(74) *Attorney, Agent, or Firm* — SCHWEGMAN LUNDBERG & WOESSNER, P.A.

(57)            ABSTRACT
A hand tool (1) for separating a deep-drawn jaw-spanning dental apparatus such as an aligner or a bite splint of thermoform film. The hand tool includes a grip (2) for holding; a separating element (3) for thermally separating the deep-drawn thermoform film and refining the separated deep-drawn thermoform; a heating device adapted to regulate heating of the separating element (3) so as to increase the temperature of the thermoform film substantially to at least its glass temperature; and a power supply device for supplying electric power to the heating device.

17 Claims, 1 Drawing Sheet

(56) References Cited

U.S. PATENT DOCUMENTS

| | | | | |
|---|---|---|---|---|
| 4,607,151 | A | * | 8/1986 | Kihlstrom .............. B23K 3/029 |
| | | | | 228/52 |
| 5,438,758 | A | * | 8/1995 | Roth-White .............. B26B 3/00 |
| | | | | 83/171 |
| 7,092,784 | B1 | | 8/2006 | Simkins |
| 2003/0198912 | A1 | | 10/2003 | Mah |
| 2007/0261251 | A1 | * | 11/2007 | Crawford .................. B26B 3/00 |
| | | | | 30/140 |
| 2015/0150651 | A1 | | 6/2015 | McDonald |
| 2018/0111213 | A1 | * | 4/2018 | Mantes ................ B23K 3/0323 |

FOREIGN PATENT DOCUMENTS

| | | | |
|---|---|---|---|
| CN | 106794685 | A | 5/2017 |
| CN | 108348306 | A | 7/2018 |
| CN | 108712893 | A | 10/2018 |
| CN | 115297802 | A | 11/2022 |
| CN | 115297802 | B | 4/2025 |
| DE | 29802582 | U1 | 6/1998 |
| EP | 3888585 | A1 | 10/2021 |
| EP | 3888585 | B1 | 11/2022 |
| JP | S51157298 | | 12/1976 |
| JP | H0492659 | | 3/1992 |
| JP | H10108872 | | 4/1998 |
| JP | 2001337411 | | 12/2001 |
| JP | 2012051020 | A * | 3/2012 |
| JP | 2012056018 | | 3/2012 |
| JP | 2023520067 | A | 5/2023 |
| JP | 7622090 | | 1/2025 |
| KR | 20220160655 | A | 12/2022 |
| WO | 2018220221 | | 12/2018 |
| WO | WO-2021197786 | A1 | 10/2021 |

OTHER PUBLICATIONS

Chinese Office Action dated Apr. 28, 2024.
"Japanese Application Serial No. 2022-560027, Notification of Reasons for Refusal mailed Oct. 29, 2024", w English translation, 4 pgs.
"European Application Serial No. 20166847.2, Extended European Search Report mailed Sep. 18, 2020", 5 pgs.
"International Application Serial No. PCT/EP2021/056135, International Preliminary Report on Patentability mailed Oct. 13, 2022", 7 pgs.
"Japanese Application Serial No. 2022-560027, Response filed Nov. 28, 2024 to Notification of Reasons for Refusal mailed Oct. 29, 2024", w/ English Translation, 9 pgs.
International Search Report; PCT/EP2021/056135; May 31, 2021 (completed); Jun. 10, 20201 (mailed).
Written Opinion of the Inlemational Searching Authority; PCT/EP2021/056135; May 31, 2021 (completed); Jun. 10, 20201 (mailed).

* cited by examiner

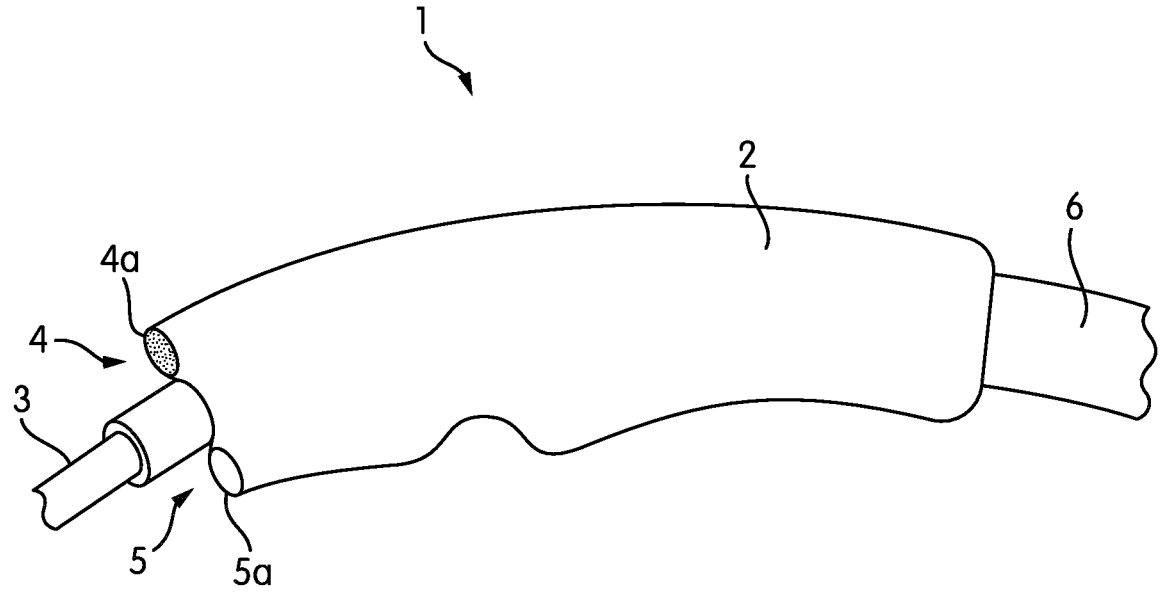

HAND TOOL FOR SEPARATING A DEEP-DRAWN JAW-SPANNING DENTAL APPARATUS OF THERMOFORM FILM

CROSS-REFERENCE TO RELATED APPLICATIONS

This is a National Phase application of International Application No. PCT/EP2021/056135, filed Mar. 11, 2021, which claims the benefit of and priority to European Application Ser. No. 20166847.2, filed on Mar. 30, 2020, which are herein incorporated by reference for all purposes.

TECHNICAL FIELD OF THE INVENTION

The present invention relates to a hand tool for separating a deep-drawn jaw-spanning dental apparatus such as an aligner or a bite splint of thermoform film. The present invention also relates to a method of using the hand tool.

BACKGROUND OF THE INVENTION

Jaw-spanning dental apparatuses made of polymethyl-methacrylate or similar materials, such as aligners or bite splints for the treatment of bruxism, are exposed to considerable masticatory loads during their use. For this reason, they are still manufactured using the deep-drawing process of thermoform films, despite modern production methods such as 3D printing. A relatively complicated post-process after deep-drawing of the thermoform film is the manual cutting and trimming of the deep-drawn thermoform film by means of milling, grinding and/or polishing tools. The manual cutting and trimming of the deep-drawn thermoform film is done, for example, with rotating instruments operated by a motorized handpiece. The resulting sharp edges must be smoothed in a time-consuming process.

SUMMARY OF THE INVENTION

An objective of the present invention is to overcome the problems of the prior art and to provide a hand tool for separating a deep-drawn jaw-spanning dental apparatus such as an aligner or a bite splint of thermoform film.

This objective has been achieved through the hand tool as defined in claim 1. The subject-matters of the dependent claims relate to further embodiments and developments.

The present invention provides a hand tool for separating a deep-drawn jaw-spanning dental apparatus such as an aligner or a bite splint of thermoform film. The hand tool comprises: a grip for holding; a separating element for thermally separating the deep-drawn thermoform film and refining the separated deep-drawn thermoform; a heating means adapted to regulate heating of the separating element so as to increase the temperature of the thermoform film substantially to at least its glass temperature; and a power supply means for supplying electric power to the heating means.

A major advantageous effect of the present invention is that by heating up the thermoform film substantially to at least its glass temperature, separation and refinement can take place in a single step. Thereby, the number of working steps can be reduced, a fast and smooth separation process can be achieved, and the overall process can be simplified. Another major advantageous effect of the present invention is that through the regulation of the temperature of the thermoform film substantially to its glass temperature, the separation of the thermoform film is possible without degradation and unnecessary melting thereof, and thus the risk of damaging the aligner or the bite splint can be prevented or reduced as much as possible.

According to the present invention, the temperature regulation may be performed through closed loop or open loop. According to the present invention, the heating means regulates heating of the separating element so that the temperature of the thermoform film never reaches the degradation temperature of the thermoform film and remains well below the degradation temperature of the thermoform film, preferably substantially at the glass temperature of the thermoform film or slightly above. Therefore, in an embodiment, a temperature sensor is used for sensing the temperature of the thermoform film in close proximity to the separating element. The heating means regulates heating of the separating element based on the sensed temperature. Alternatively, a thermodynamic model may be applied to the heating means to obviate the need of using the temperature sensor. Thus, the heating means may regulate heating of the separating element based on the thermodynamic model which takes account of the temperature drop between the separating element and the thermoform film in close proximity thereof. The thermodynamic model may be based on empirical data.

The deep-drawn jaw-spanning dental apparatus such as the aligner or the bite splint is usually made of Polymethylmethacrylate (PMMA). Therefore, in an embodiment, the heating means is further adapted to regulate heating of the separating element so as to increase the temperature of the thermoform substantially to at least 105 degrees Celsius which corresponds to the glass temperature of Polymethylmethacrylate. However, different type of thermoform films may be alternatively used. Therefore, alternatively, the user may be allowed to selectively set the heating means in accordance with the type of the thermoform film to be separated.

According to the present invention, the separating element may be provided with different forms that mechanically improve the separation process. In alternative embodiments, the separating element is preferably provided in the form of a knife, a chisel, a spike, or a needle which is protruding from the front of the grip.

According to the present invention, the hand tool may be provided with a suction means for extracting the fumes resulting during the separation of the deep-drawn thermoform film. The suction means may be fully integrated into the portable hand tool. Therefore, in an embodiment, the suction means is preferably fully integrated into the grip in a fully portable manner. In this embodiment, the suction means comprises: a channel which is arranged in close proximity of the separating element; a filter arranged in the channel; and a fan adapted to extract the fumes resulting during the separation of the deep-drawn thermoform film into the channel towards the filter. And the power supply means is further adapted to supply electric power to the fan. The filter preferably comprises active carbon. Alternatively, the suction means may be partially integrated into the hand tool. Therefore, in an alternative embodiment, the suction means comprises: a channel which is arranged in close proximity of the separating element; and a hose connected to the channel for conveying the fumes resulting during the separation of the deep-drawn thermoform film to an external extractor which is preferably detachably connectable to the other end of the hose. Alternatively, the hose may be connected to the external extractor in a fixed manner. The hose is preferably detachably connectable to the channel at the rear of the grip. Alternatively, the hose may be connected to the grip in a fixed manner. The eternal extractor has a filter and a fan.

According to the present invention, the hand tool may be provided with illumination for the purpose of visual/navigation guidance, improved vision and/or user guidance. Therefore, in an embodiment, the hand tool further comprises an illuminating means. The power supply means is further adapted to supply electric power to the illuminating means. In a version of this embodiment, the illuminating means has a laser pointer which is arranged in close proximity to the separating element and adapted to provide visual guidance for the user when moving the separating element. In a further version of this embodiment, the illuminating means has one or more light sources adapted to illuminate at least the tip of the separating element to provide an improved vision to the user. In a further version of this embodiment, the illuminating means has one or more light sources with one or more different colors. And the illuminating means is adapted to indicate the temperature of the separating element through selecting a corresponding color to provide user guidance: For instance, green may be used to indicate that during the regulation, the temperature has reached the target level for the separation process. And red may be used to indicate that during the regulation, the temperature has not yet reached the target level for the separation process, and thus the user needs to wait the green light to be turned on.

According to the present invention, the power supply means may be battery driven and/or connectable to the mains via a fixed or detachable cable.

In an embodiment, the power supply means is preferably connectable to the mains via an electric cable. The power supply means preferably has a socket on the grip. And the socket can receive a plug of the electric cable which is connectable to the mains. Alternatively, the cable may be connected to the grip in a fixed manner. In an embodiment, the power supply means is preferably operable by one or more batteries, preferably rechargeable batteries. And the grip has a battery holder for receiving one or more batteries. In a version of this embodiment, the power supply means preferably has a charging unit connectable to the mains for recharging the batteries. The charging unit is preferably provided in form of a separate portable station which receives the hand tool. Alternately the charging unit may be integrated into the grip and connectable to the mains via an electric cable.

The present invention also provides a method of using the hand tool. The method comprises, at least, a step of deep-drawing a thermoform film using a model to manufacture a jaw-spanning dental apparatus such as an aligner or a bite splint; and a step of separating and refining the deep-drawn thermoform film while being supported or clamped by the model and by moving the heated separating element along a separation contour on the thermoform film or the model.

BRIEF DESCRIPTION OF THE DRAWING

In the subsequent description, further aspects and advantageous effects of the present invention will be described in more detail by using exemplary embodiments and by reference to the drawing, wherein FIG. 1—is schematic partial view of the hand tool according to an embodiment of the present invention.

The reference numbers shown in the drawing denote the elements as listed below and will be referred to in the subsequent description of the exemplary embodiments:

1. Hand tool
2. Grip
3. Separating element
4. Suction means
4a. Channel
5. Illuminating means
5a. Laser pointer
6. Hose

DETAILED DESCRIPTION OF THE INVENTION

FIG. 1 shows an embodiment of the hand tool (1) for separating a deep-drawn jaw-spanning dental apparatus such as an aligner or a bite splint of thermoform film. The hand tool (1) comprises a grip (2) for holding; a separating element (3) for thermally separating the deep-drawn thermoform film and refining the separated deep-drawn thermoform; a heating means adapted to regulate heating of the separating element (3) so as to increase the temperature of the thermoform film substantially to at least its glass temperature; and a power supply means for supplying electric power to the heating means.

In a further embodiment, the hand tool (1) comprises a temperature sensor for sensing the temperature of the thermoform film in close proximity to the separating element (3), wherein the heating means is further adapted to regulate heating of the separating element (3) based on the sensed temperature.

In a further alternative embodiment, a thermodynamic model is applied to the heating means to obviate the need of using the temperature sensor. The thermodynamic model takes account of the temperature drop between the separating element (3) and the thermoform film in close proximity thereof. The thermodynamic model is based on empirical data.

The deep-drawn jaw-spanning dental apparatus such as the aligner or the bite splint is usually made of Polymethylmethacrylate (PMMA). Therefore, in a further embodiment, the heating means is further adapted to regulate heating of the separating element (3) so as to increase the temperature of the thermoform film substantially to at least 105 degrees Celsius which corresponds to the glass temperature of Polymethylmethacrylate.

In a further alternative embodiment, the heating means can be regulated in accordance with a thermoform film other than PMMA to be separated. In an alternative version of this embodiment, the user may selectively set the heating means in accordance with the type of the thermoform film to be separated.

In further alternative embodiments, the separating element (3) is preferably provided in the form of a knife, a chisel, a spike, or a needle which is protruding from the front of the grip (2).

As shown in FIG. 1, the hand tool (1) comprises a suction means (4) which comprises: a channel (4a) which is arranged in close proximity of the separating element (3); and a hose (6) connected to the channel (4a) for conveying the fumes resulting during the separation of the deep-drawn thermoform film to an external extractor which is preferably detachably connectable to the hose (6).

In a further alternative embodiment, the hose (6) is connected to the external extractor in a fixed manner.

In a further alternative embodiment, the hose (6) is detachably connectable to the channel (4a) at the rear of the grip (2).

In a further alternative embodiment, the hose (6) is fixed to the grip (2).

In an alternative embodiment, the suction means (4) is fully integrated into the grip (2). In this alternative embodiment, the suction means (4) comprises: a channel (4a) which is arranged in close proximity of the separating element (3); a filter arranged in the channel (4a); and a fan adapted to extract the fumes resulting during the separation of the deep-drawn thermoform film into the channel (4a) towards the filter. And the power supply means is further adapted to supply electric power to the fan. The filter preferably comprises active carbon.

As shown in FIG. 1, the hand tool (1) further comprises an illuminating means (5). The power supply means is further adapted to supply electric power to the illuminating means (5).

As shown in FIG. 1, the illuminating means (5) has a laser pointer (5a) which is arranged in close proximity to the separating element (3) and adapted to provide visual guidance for the user when moving the separating element (3).

In a further embodiment, the illuminating means (5) has one or more light sources adapted to illuminate at least the tip of the separating element (3).

In a further embodiment, the illuminating means (5) has one or more light sources with one or more different colors. And the illuminating means (5) is adapted to indicate the temperature of the separating element (3) through selecting a corresponding color. For instance, green may be used to indicate that during the regulation, the temperature has reached the target level for the separation process. And red may be used to indicate that during the regulation, the temperature has not yet reached the target level for the separation process, and thus the user needs to wait the green light to be turned on.

In a further embodiment, the power supply means is operable through one or more rechargeable batteries. And the grip (2) has a battery holder for receiving the rechargeable batteries.

In a further embodiment, the power supply means has a charging unit connectable to the mains for recharging the batteries.

In a further embodiment, the power supply means is connectable to the mains via an electric cable.

In a further embodiment, the electric cable is arranged within the hose (6).

In a further embodiment, the power supply means has a socket on the grip (2). And the socket can receive a plug of the electric cable which is connectable to the mains.

The present invention also provides a method of using the hand tool (1). The method comprises, at least, a step of deep-drawing a thermoform film using a model to manufacture a jaw-spanning dental apparatus such as an aligner or a bite splint; and a step of separating and refining the deep-drawn thermoform film while being supported or clamped by the model and by moving the heated separating element (3) along a separation contour on the thermoform film or the model.

The invention claimed is:

1. A hand tool for separating a deep-drawn jaw-spanning dental apparatus comprising:

a grip;

a separating element configured to thermally separate a deep-drawn thermoform film and refine the separated deep-drawn thermoform in a single step;

a heating means configured to regulate heating of the separating element so as to increase the temperature of the thermoform film substantially to at least its glass temperature without degradation and unnecessary melting of the thermoform film; and

a power supply means for supplying electric power to the heating means;

wherein the separating element is configured to follow a separation contour on the thermoform film.

2. The hand tool according to claim 1, further comprising:

a temperature sensor configured to sense the temperature of the thermoform film in close proximity to the separating element, wherein the heating means is further configured to regulate heating of the separating element based on the sensed temperature.

3. The hand tool according to claim 1, wherein the heating means is further adapted to regulate heating of the separating element so as to increase the temperature of the thermoform substantially to at least 105 degrees Celsius which corresponds to the glass temperature of Polymethylmethacrylate.

4. The hand tool according to claim 1, wherein the separating element is provided in the form of a knife, chisel, a spike, or a needle which protrudes from the front of the grip.

5. The hand tool according to claim 1, further comprising a suction means which comprises: a channel which is arranged in close proximity of the separating element; a filter arranged in the channel; and a fan adapted to extract the fumes resulting during the separation of the deep-drawn thermoform film into the channel towards the filter, wherein the suction means is integrated into the grip, and the power supply means is further adapted to supply electric power to the fan.

6. The hand tool according to claim 1, further comprising a suction means which comprises: a channel which is arranged in close proximity of the separating element; and a hose connected to the channel for conveying the fumes resulting during the separation of the deep-drawn thermoform film to an external extractor which is detachably connectable or connected to the hose.

7. The hand tool according to claim 6, wherein the hose is detachably connectable to the channel at the rear of the grip.

8. The hand tool according to claim 1, further comprising an illuminating means, wherein the power supply means is further adapted to supply electric power to the illuminating means.

9. The hand tool according to claim 8, wherein the illuminating means has a laser pointer which is arranged in close proximity to the separating element and adapted to provide visual guidance for the user when moving the separating element.

10. The hand tool according to claim 8 wherein the illuminating means has one or more light sources adapted to illuminate at least the tip of the separating element.

11. The hand tool according to claim 8, wherein the illuminating means has one or more light sources with one or more different colors, wherein the illuminating means is adapted to indicate the temperature of the separating element through selecting a corresponding color.

12. The hand tool according to claim 1, wherein the power supply means is operable by one or more rechargeable batteries, wherein the grip has a battery holder for receiving one or more rechargeable batteries.

13. The hand tool according to claim 12, wherein the power supply means has a charging unit connectable to the mains for recharging the batteries.

14. The hand tool according to claim 1, wherein the power supply means is connectable to the mains via an electric cable.

15. The hand tool according to claim 14, wherein the power supply means has a socket on the grip, wherein the socket can receive a plug of an electric cable which is connectable to the mains.

16. A method for separating a deep-drawn jaw-spanning dental apparatus comprising:

thermally separating a deep-drawn thermoform film and refining the separated deep-drawn thermoform in a single step using a separating element of a hand tool, the hand tool comprising a grip;

regulating heating of the separating element, using a heating means of the hand tool, to increase a temperature of the thermoform film substantially to at least its glass temperature without degradation and unnecessary melting of the thermoform film; and supplying, by a power supply means of the hand tool, electric power to the heating means;

wherein the separating element is configured to follow a separation contour on the thermoform film.

17. The method of claim 16, wherein the deep drawn thermoform file is obtained by deep drawing a thermoform film using a model to manufacture a jaw-spanning dental, and wherein the deep-drawn thermoform film is separated and refined while being supported or clamped by the model and the heated separating element is moved along a separation contour on the thermoform film or the model.

* * * * *